United States Patent
Czarnecki et al.

[11] Patent Number: 6,152,053
[45] Date of Patent: Nov. 28, 2000

[54] METHOD AND ASSEMBLY FOR CONVERTING WASTE WATER ACCUMULATED IN A FOSSIL FUEL-FIRED POWER GENERATION SYSTEM

[75] Inventors: Thomas S. Czarnecki, Pleasant Valley; Gustave E. Friedrichs, Canton; Douglas F. Grabowski, Suffield; Michael C. Tanca, Tarriffville, all of Conn.

[73] Assignee: ABB Alstom Power Inc., Windsor, Conn.

[21] Appl. No.: 09/364,160

[22] Filed: Jul. 30, 1999

[51] Int. Cl.[7] ............... F23N 5/02; F23R 7/00; F23J 11/00
[52] U.S. Cl. ............... 110/345; 110/190; 110/233
[58] Field of Search ............... 110/190, 215, 110/233, 342, 344, 345, 302, 303, 304, 306

[56] References Cited

U.S. PATENT DOCUMENTS

| | | | |
|---|---|---|---|
| 4,478,810 | 10/1984 | Bloss et al. | 423/555 |
| 4,620,856 | 11/1986 | Rosenberg et al. | 55/73 |
| 4,796,207 | 1/1989 | Andre et al. | 364/557 |
| 4,987,839 | 1/1991 | Krigmont et al. | 110/216 |
| 5,001,994 | 3/1991 | Morimoto et al. | 110/342 |
| 5,024,171 | 6/1991 | Krigmont et al. | 110/345 |
| 5,029,535 | 7/1991 | Krigmont et al. | 110/345 |
| 5,216,966 | 6/1993 | Martin | 110/216 |
| 5,237,939 | 8/1993 | Spokoyny et al. | 110/345 |
| 5,282,429 | 2/1994 | Kato et al. | 110/344 |
| 5,320,052 | 6/1994 | Spokoyny et al. | 110/345 |
| 5,336,081 | 8/1994 | Saito et al. | 431/4 |
| 5,626,086 | 5/1997 | Malone | 110/190 |
| 5,693,300 | 12/1997 | Slone | 423/235 |
| 5,787,821 | 8/1998 | Bhat et al. | 110/216 |

*Primary Examiner*—Pamela Wilson
*Assistant Examiner*—Ken B. Rinehart
*Attorney, Agent, or Firm*—Russell W. Warnock

[57] ABSTRACT

A method and an assembly for efficiently converting waste water to a gaseous state in a fossil fuel-fired power generation system is provided. The method includes feeding the slurry to the spray dryer reactor, the slurry having a predetermined ratio of liquid to absorbent, and controlling the feed rate of the slurry into the spray dryer reactor as a function of the monitored sulfur oxide level such that the sulfur oxide level is maintained within an acceptable range. The method also includes supplying supplemental liquid in the form of waste water into the spray dryer reactor in a non-proportionate manner relative to the feed of absorbent into the spray dryer reactor such that the ratio of liquid to absorbent in the spray dryer reactor changes. Both the supply rate of supplemental liquid into the spray dryer reactor and the temperature of the flue gas entering the spray dryer reactor are controlled in dependence upon the temperature of the flue gas exiting the spray dryer reactor such that, in the event that the sensed temperature of the flue gas exiting the spray dryer reactor is below a minimum acceptable flue gas exit temperature, the supply rate of supplemental liquid is controlled according to a prescribed manner.

7 Claims, 2 Drawing Sheets

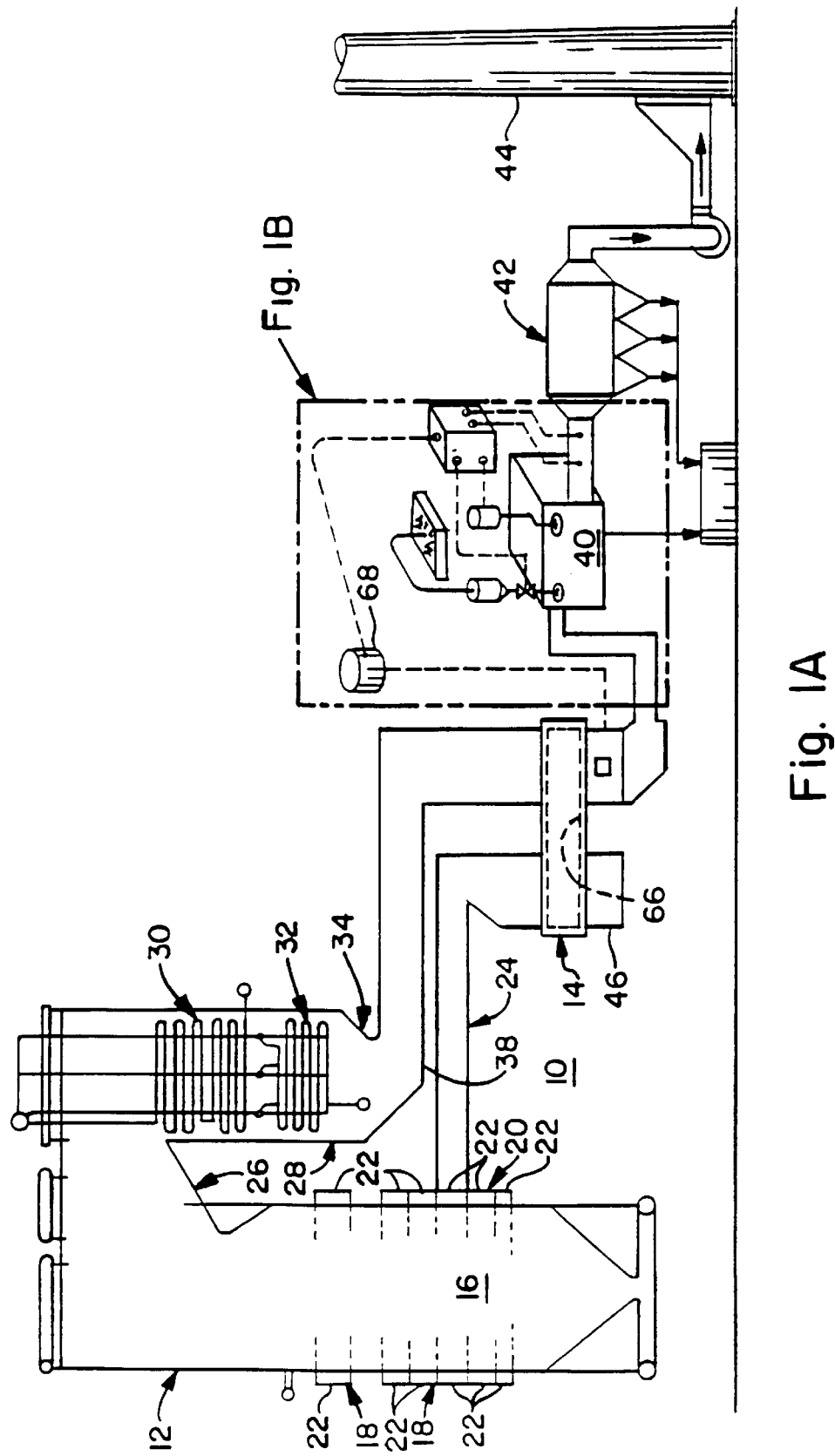

METHOD AND ASSEMBLY FOR CONVERTING WASTE WATER ACCUMULATED IN A FOSSIL FUEL-FIRED POWER GENERATION SYSTEM

BACKGROUND OF INVENTION

The combustion of sulfur bearing fossil fuels such as coal engenders the creation of sulfur oxides and the reduction of these sulfur oxides has been established as the goal of a variety of legislation. It has thus become an accepted practice to provide as appropriate sulfur oxide removal systems integrated into fossil fuel-fired power generation systems to remove sulfur oxides from the flue gas combustion products.

One known sulfur oxide removal system is a so-called dry sulfur oxide scrubbing system comprising a chamber through which flue gas is flowed and in which a sulfur oxide absorbent is delivered into contact with the flue gas to achieve a reaction process with the sulfur oxide in the flue gas. A resultant product of this reaction process is the formation of a dry particulate which is amenable to separation from the flue gas via, for example, a dry particulate collection assembly. Typically, flue gas is passed through an air preheater prior to its contact with the sulfur oxide absorbent for the purpose of effecting a transfer of heat from the flue gas to incoming air ultimately destined for consumption in the combustion process. Moreover, the flue gas generally retains sufficient heat content, in spite of the upstream heat exchange at the air preheater, to permit the delivery of the sulfur oxide absorbent into contact with the flue gas by means of a slurry, as the liquid fraction of the slurry will be vaporized by the flue gas.

It may be noted that there is today a heightened awareness that the disposal of certain products and by-products of the combustion process in one form may be preferred to the disposal of the same product or by-product in another form. One such by-product is waste water used or created during the combustion process and its ancillary processes. The disposal of this waste water, which hereafter shall be taken to mean any liquid composition of predominantly water which is produced by, or remains from, the various processes which occur in a fossil fuel-fired power generation system including its combustion and heat exchanges process, can present a challenge, particularly if, in a given situation, it is preferred that the waste water not be disposed of in its liquid form.

Accordingly, the need exists for realistic opportunities for the disposal of waste water accumulated in a fossil fuel-fired power generation system in a manner which minimizes the impact on the efficiency of the system.

SUMMARY OF THE INVENTION

The present invention, in one aspect thereof, provides a method for the disposal of waste water accumulated in a fossil fuel-fired power generation system in a manner which minimizes the impact on the efficiency of the system. Also, in another aspect thereof, the present invention provides an assembly for the disposal of waste water accumulated in a fossil fuel-fired power generation system in a manner which minimizes the impact on the efficiency of the system.

In accordance with the one aspect of the present invention, the method thereof is operable to efficiently convert waste water to a gaseous state in a system having a combustion assembly, a regenerative air preheater, and a spray dryer reactor. The combustion assembly in which the method is capable of being used is operable to burn combustible material in a process which produces flue gas having sulfur oxides therein and the flue gas passes successively through the regenerative air preheater for an exchange of heat from the flue gas to incoming air ultimately introduced into the burning process. After passage through the regenerative air preheater, the flue gas next enters the spray dryer reactor for contact with a liquid slurry having sulfur oxide absorbent material so as to produce a dry particulate reaction product which can be disentrained from the flue gas after it has exited the spray dryer reactor.

The method for efficiently converting waste water to a gaseous state of the present invention includes feeding the slurry to the spray dryer reactor, the slurry having a predetermined ratio of liquid to absorbent, and controlling the feed rate of the slurry into the spray dryer reactor as a function of the monitored sulfur oxide level such that the sulfur oxide level is maintained within an acceptable range. Furthermore, the method includes sensing the temperature of the flue gas exiting the spray dryer reactor and monitoring the sulfur oxide level of the flue gas downstream of the spray dryer reactor.

According to further details of the method of the present invention, the method includes supplying supplemental liquid into the spray dryer reactor in a non-proportionate manner relative to the feed of absorbent into the spray dryer reactor such that the ratio of liquid to absorbent in the spray dryer reactor changes. Additionally, the method includes controlling both the supply rate of supplemental liquid into the spray dryer reactor and the temperature of the flue gas entering the spray dryer reactor in dependence upon the temperature of the flue gas exiting the spray dryer reactor such that, in the event that the sensed temperature of the flue gas exiting the spray dryer reactor is below a minimum acceptable flue gas exit temperature, the supply rate of supplemental liquid is controlled in accordance with the following prescribed manner. Initially, the supply rate of supplemental liquid into the spray dryer reactor is decreased by an initial decrease amount. Thereafter, the temperature of the flue gas exiting the spray dryer reactor is sensed and, subsequently, if the sensed temperature of the flue gas exiting the spray dryer reactor is still below the minimum acceptable flue gas exit temperature, at least one of a further decreased in the initially decreased supply rate of supplemental liquid and a further increase in the temperature of the flue gas entering the spray dryer reactor is implemented until the sensed temperature of the flue gas exiting the spray dryer reactor is above the minimum acceptable flue gas exit temperature.

In accordance with the another aspect of the present invention, the assembly for efficiently converting waste water to a gaseous state includes a spray dryer reactor for contacting the flue gas with a liquid slurry having sulfur oxide absorbent material so as to produce a dry particulate reaction product which can be disentrained from the flue gas after it has exited the spray dryer reactor, the slurry having a predetermined ratio of liquid to absorbent and means for controlling the feed rate of the slurry into the spray dryer reactor as a function of the monitored sulfur oxide level such that the sulfur oxide level is maintained within an acceptable range. Additionally, the assembly includes means for sensing the temperature of the flue gas exiting the spray dryer reactor and means for monitoring the sulfur oxide level of the flue gas downstream of the spray dryer reactor.

The assembly further includes means for supplying supplemental liquid into the spray dryer reactor in a non-proportionate manner relative to the feed of absorbent into the spray dryer reactor such that the ratio of liquid to absorbent in the spray dryer reactor changes and means for controlling both the supply rate of supplemental liquid into the spray dryer reactor and the temperature of the flue gas entering the spray dryer reactor in dependence upon the temperature of the flue gas exiting the spray dryer reactor.

BRIEF DESCRIPTION OF THE DRAWINGS

FIG. 1A is a side elevational view, in partial vertical section, of a fossil fuel-fired power generation system with which the method of the present invention is capable of being employed.

DETAILED DESCRIPTION OF THE PREFERRED EMBODIMENT

Figure 1B:
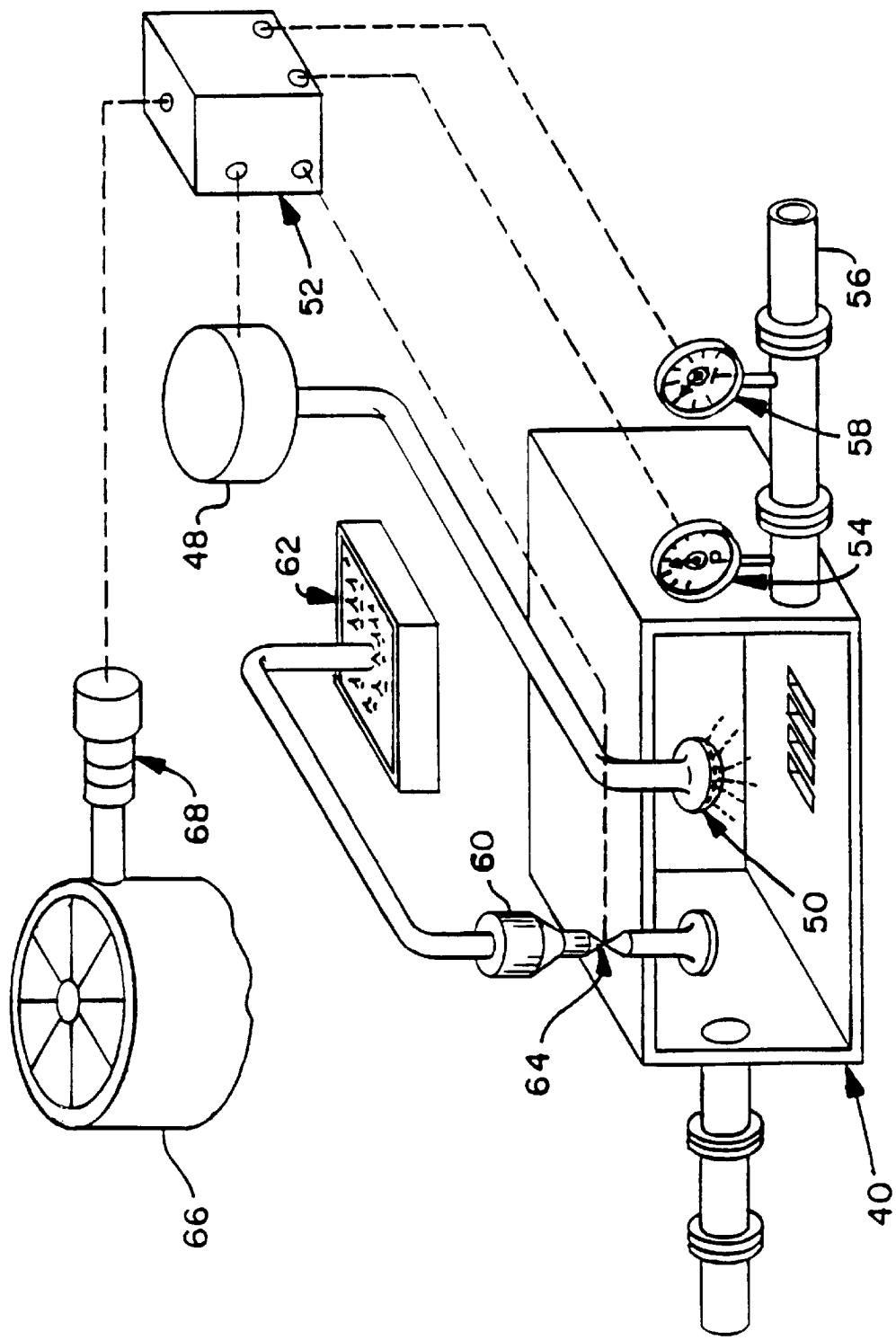
FIG. 1B is an enlarged view, in partial perspective and vertical section, of a portion of the fuel-fired power generation system shown in FIG. 1A comprising a spray dryer reactor and diagrammatically depicting the functional relationship of several other components of the fuel-fired power generation system with the spray dryer reactor.

Referring now to the drawings, and more particularly to FIG. 1A thereof, there is depicted therein one embodiment of a fossil fuel-fired power generation system, generally designated by the reference numeral 10, with which the method of the present invention for converting waste water to a gaseous is capable of being employed. In accordance with the illustration thereof in FIG. 1A, the fossil fuel-fired power generation system 10 includes a fossil fuel-fired steam generator, generally designated by the reference numeral 12, and an air preheater, generally designated therein by the reference numeral 14.

Attention will first be focused on the fossil fuel-fired steam generator 12. In accordance with the illustration thereof in FIG. 1A of the drawing, the fossil fuel-fired steam generator 12 includes a burner region, generally designated in FIG. 1A by the reference numeral 16. It is within the burner region 16 of the fossil fuel-fired steam generator 12 that the combustion of fossil fuel and air, in a manner well-known to those skilled in this art, is initiated. To this end, the fossil fuel-fired steam generator 12 is provided with a firing system, generally designated by the reference numeral 18. By way of exemplification and not limitation, the nature of the construction of the firing system 18 may take the form of that which comprises the subject matter of U.S. Pat. No. 5,020,454, which issued on Jun. 9, 1991 and which is assigned to the same assignee as the present application.

It is deemed to be adequate for purposes of acquiring an understanding of the subject matter of the present invention that there be presented herein merely a description of the nature of only some of the components of which the firing system 18 is comprised. Reference is thus had in this regard to the fact that as best understood with reference to FIG. 1A of the drawing the firing system 18 includes a housing preferably in the form of a windbox denoted generally in FIG. 1A by the reference numeral 20. The windbox 20 in a manner well-known to those skilled in this art is supported by conventional support means (not shown) in the burner region 16 of the fossil fuel-fired steam generator 12 such that the longitudinal axis of the windbox 20 extends substantially in parallel relation to the longitudinal axis of the fossil fuel-fired steam generator 12. Further, as denoted schematically at 22 in FIG. 1A the windbox 20 embodies in known fashion a plurality of compartments. In conventional fashion some of the compartments 22 are designed to function as fuel compartments from which fossil fuel is injected into the burner region 16 of the fossil fuel-fired steam generator 12, while others of the compartments 22 are designed to function as air compartments from which air is injected into the burner region 16 of the fossil fuel-fired steam generator 12. The fossil fuel, which is injected into the burner region 16 of the fossil fuel-fired steam generator 12 from the fuel compartments 22, is supplied to the windbox 20 by a fuel supply means not shown in the interest of maintaining clarity of illustration in the drawing. Similarly, at least some of the air, which is injected into the burner region 16 of the fossil fuel-fired steam generator 12 for purposes of effecting the combustion therewithin of the fuel that is injected thereinto, is supplied to the windbox 20 from the air preheater 14 through the duct, which is schematically depicted in FIG. 1A of the drawing wherein the duct is denoted generally by the reference numeral 24. For a more detailed description of the nature of the construction and the mode of operation of the firing system 18, one may have reference to the aforementioned U.S. Pat. No. 5,020,454.

Continuing with the description of the fossil fuel-fired steam generator 12, which is illustrated in FIG. 1A of the drawing, it is within the burner region 16 of the fossil fuel-fired steam generator 12, as has been mentioned previously herein, that the combustion of the fossil fuel and air, which is injected thereinto, is initiated. The hot gases that are produced from this combustion of the fossil fuel and air rise upwardly in the fossil fuel-fired steam generator 12. During the upwardly movement thereof in the fossil fuel-fired steam generator 12, the hot gases in a manner well-known to those skilled in this art give up heat to the fluid flowing through the tubes (not shown in the interest of maintaining clarity of illustration in the drawing) that in conventional fashion line all four of the walls of the fossil fuel-fired steam generator 12. Then, the hot gases flow through the horizontal pass, generally designated by the reference numeral 26, of the fossil fuel-fired steam generator 12, which in turn leads to the rear gas pass, generally designated by the reference numeral 28, of the fossil fuel-fired steam generator 12. Although not shown in FIG. 1A of the drawing in the interest of maintaining clarity of illustration in the drawing, it is to be understood that the horizontal pass 26 would commonly have suitably provided therewithin some form of heat transfer surface. Similarly, heat transfer surface, as illustrated at 30 and 32 in FIG. 1A of the drawing, is suitably provided within the gas pass 28. In this regard, the heat transfer surfaces 30 and 32 preferably are in the form of superheater surface and economizer surface, respectively. During the passage thereof through the rear gas pass 28 of the fossil fuel-fired steam generator 12, the hot gases give up heat to the fluid flowing through the tubes depicted in FIG. 1A of which the superheater 30 is comprised as well as to the fluid flowing through the tubes also depicted in FIG. 1A of which the economizer 32 is comprised.

Upon exiting from the rear gas pass 28 of the fossil fuel-fired steam generator 12 the hot gases are conveyed to the air preheater 14. To this end, the fossil fuel-fired steam generator 12 is connected from the exit end thereof, which is denoted generally in FIG. 1A by the reference numeral 34, to the air preheater 14 by means of duct work, which is denoted generally in FIG. 1A by the reference numeral 36.

For purposes of completing the description of the nature of the construction of the fossil fuel-fired power generation system 10, reference will once again be had to FIG. 1A of the drawing. As best understood with reference to FIG. 1A of the drawing, the hot gases that are conveyed from the fossil fuel-fired steam generator 12 to the air preheater 14 flow through the air preheater 14 and exit therefrom, as shown at 38 to a spray dryer reactor 40 and, thereafter, through a particulate control assembly 42. Finally, the cleaned flue gas is released through a stack 44. In the course of flowing through the air preheater 14 the hot gases give up heat to the air, which enters the air preheater 14 at the point denoted by the reference numeral 46 in FIG. 1A. After being heated within the air preheater 14, this air that entered the air preheater 14 at 46 is conveyed through the duct 24, to which reference has previously been had herein, to the windbox 20 of the firing system 18. The air, which enters the air preheater 14 at 46, is supplied thereto in known fashion from an air supply means (not shown in FIG. 1A in the interest of maintaining clarity of illustration therein).

More detailed reference will now be had to a sub system of the fuel-fired power generation system 10 whose operation is controlled in a manner described hereafter to implement the method of the present invention. This sub system will hereinafter be referred to as the flue gas desulfurization sub system and attention is now directed to FIG. 1B in which the sub system is illustrated in greater detail and in which the functional relationship of the components of the sub system to each other and to the spray dryer reactor 40 are diagrammatically depicted. Moreover, the operation of these components including the spray dryer reactor 40 in implementing the method of the present invention will also be described.

As seen in FIG. 1B, the spray dryer reactor 40 forms an enclosed chamber into which a sulfur oxide absorbent slurry is fed to react with the sulfur oxides of the hot gases or flue gas. As viewed relative to the flow of the flue gas through the fuel-fired power generation system 10, the spray dryer reactor 40 is immediately downstream of the air preheater 14 and is immediately upstream of the particulate control assembly 42. A principal portion of the sulfur oxides comprised in the flue gas react with the sulfur oxide absorbent in the slurry in a reaction in which the sulfur oxides are absorbed in the form of dry particulate sulfur compounds such as sulfite or sulfate powders. This resulting dry particulate material is filtered out of the flue gas at the particulate control assembly 42 to which the flue gas travels after its passage through the spray dryer reactor 40 and the thus cleaned flue gas is thereafter released via the stack 44.

The spray dryer reactor 40 includes a slurry feed assembly 48 having a feed inlet 50 for injecting into the spray dryer reactor chamber a mixture of the sulfur oxide absorbent and a liquid which together form the slurry. The slurry feed assembly 48 is connected to a dryer sub-process control device 52 for controlling the feed operation of the slurry feed assembly.

A sulfur oxide emissions level detector 54 is disposed for detecting the level of sulfur oxide in the flue gas exiting the spray dryer reactor 40 and is preferably disposed relatively adjacent the flue gas exit of the spray dryer reactor 40 such as at a detecting location relative to an outlet pipe 56 fluidly communicating the flue gas exit of the spray dryer reactor 40 and the particulate control assembly 42. The sulfur oxide emissions level detector 54 is connected to the dryer sub-process control device 52 for providing signals thereto indicating the detected sulfur oxide level of the exiting flue gas.

A temperature sensor 58 is also disposed relative to the outlet pipe 56 at a temperature sensing location for sensing the temperature of the flue gas exiting the spray dryer reactor 40. The temperature sensor 58 is connected to the dryer sub-process control device 52 for providing signals thereto indicating the sensed temperature of the exiting flue gas.

A waste water supply device 60 is mounted relative to the spray dryer reactor 40 for supplying waste water thereto. The waste water supply device 60 is fluidly communicated with a waste water supply reservoir 62 for pre-supply replenishment of the waste water charge or reserve stored in the waste water supply device 60. A valve 64 is operable to selectively restrict up to closing and to permit the supply flow of waste water from the waste water supply device 60 to the spray dryer reactor 40. The valve 64 is operatively connected to the dryer sub-process control device 52 for control thereby of the supply of waste water to the spray dryer reactor 40.

For purposes of completing the description of the flue gas desulfurization sub system of the fuel-fired power generation system 10, reference is had to FIGS. 1A and 1B in which it is seen that the air preheater 14 comprises a rotary regenerative member 66 and a drive motor 68 for rotatingly driving the rotary regenerative member 66. The rotary regenerative member 66 rotates in known manner to sequentially dispose heat exchange plates in the path of flue gas flowing from the exit end 34 of the rear gas pass 28, whereupon heat is transferred from the flue gas to the heat exchange plates, and in the path of incoming air destined for the windboxes 20, whereupon heat is transferred from the heat exchange plates to the incoming air.

The dryer sub-process control device 52 may be configured as a software based device, a programmable logic circuit (PLC), or any other suitable configuration having the capability to receive the various input signals from the aforementioned sensors, detectors, and machine controls, to evaluate such signals relative to other signals or pre-stored data, and to transmit control signals to the machine controls to control the sub-system of the fuel-fired power generation system 10 comprising the air preheater 14, the spray dryer reactor 40, and the associated components just described. Additionally, the dryer sub-process control device 52 preferably includes an operator interface element (not shown) which displays selected indicators of the operation of the sub-system and which permit the input of operation change instructions from an operator.

The dryer sub-process control device 52 is operable to implement of the method of operating the spray dryer reactor of the present invention and this implementation of the method is preferably accomplished as follows. The signals received by the dryer sub-process control device 52 are delineated as: (1) signals from the slurry feed assembly 48 providing information concerning the slurry feed parameters such as, for example, the rate of feed of the slurry into the spray dryer reactor 40 and the ratio or concentration of liquid to sulfur oxide absorbent; (2) signals from the sulfur oxide emissions level detector 54 providing information concerning the detected sulfur oxide level of the flue gas exiting the spray dryer reactor 40; and (3) signals from the temperature sensor 58 providing information concerning the temperature of the exiting flue gas. Additionally, the dryer sub-process control device 52 receives machine control feedback signals from, for example, the valve 64 associated with the waste water supply device 60 providing information concerning the rate of supply of waste water from the device into the spray dryer reactor 40 and signals from the drive motor 68 providing information concerning the rate of rotation (e.g., the revolutions per minute [rpm]) of the rotary regenerative device 66.

As noted, the dryer sub-process control device 52, in addition to its signal receipt and processing capability, also includes a data evaluation capability by which it can compare the information provided by the received signals with preset or updated information concerning the operational parameters relating to the flue gas desulfurization sub system. In this regard, the dryer sub-process control device 52 compares the detected sulfur oxide level with a preset acceptable sulfur oxide level value; compares the sensed flue gas exit temperature with a preset minimum acceptable flue gas exit temperature value; and compares the reported liquid to sulfur oxide absorbent ratio of the slurry with a preset acceptable liquid to sulfur oxide absorbent ratio. Any deviation or compliance of the reported monitored operational parameters from the preset operational parameter values are evaluated by the dryer sub-process control device 52 for the purpose of formulating machine control signals which, as will now be described, control the operations of the components of the flue gas desulfurization sub system.

The flue gas desulfurization sub system is operable to implement the method of the present invention so as to effect a reliable and compliant reduction of the sulfur oxides in the flue gas while additionally providing a capability to reduce up to completely eliminating any waste water, in its liquid phase, which may accumulate from the combustion operation. The method of the present invention includes the step of feeding the slurry to the spray dryer reactor with the slurry having a predetermined ratio of liquid to absorbent. This step is accomplished under the control of the dryer sub-process control device 52 which transmits machine control signals to the slurry feed assembly 48 to control the slurry feed assembly to feed the slurry into the spray dryer reactor 40 at a predetermined rate and at a predetermined liquid to sulfur oxide absorbent ratio. The machine control signals are formulated by the dryer sub-process control device 52 as a function of its evaluation of the signals received from the slurry feed assembly 48 and their deviation from preset values.

In accordance with the method of the present invention, one of the method steps includes monitoring the sulfur oxide level of the flue gas downstream of the spray dryer reactor. Consequently, one of the operational parameters which is evaluated by the dryer sub-process control device 52 in formulating the machine control signals to the slurry feed assembly 48 is the sulfur oxide level of the flue gas exiting the spray dryer reactor 40. Specifically, the dryer sub-process control device 52 generates machine control signals to the slurry feed assembly 48 to control the feed rate of the slurry into the spray dryer reactor 40 as a function of the monitored sulfur oxide level such that the sulfur oxide level is maintained within an acceptable range.

Another step of the method of the present invention includes sensing the temperature of the flue gas exiting the spray dryer reactor and this step is preferably accomplished by the transmission of signals from the temperature sensor 58 to the dryer sub-process control device 52. The dryer sub-process control device 52 generates machine control signals as a function of its evaluation of the sensed flue gas exit temperature; these machine control signals will be discussed hereafter.

To achieve the objective of reducing the waste water accumulated during the operation of the fossil fuel-fired power generation system 10, the method of the present invention further includes the step of supplying supplemental liquid in the form of waste water into the spray dryer reactor 40 in a non-proportionate manner relative to the feed of sulfur oxide absorbent into the spray dryer reactor such that the ratio of liquid to sulfur oxide absorbent in the spray dryer reactor changes from the predetermined ratio which obtains in the slurry as it is introduced into the spray dryer reactor 40 to an increasingly greater liquid to absorbent ratio. This method step is executed by the dryer sub-process control device 52 which transmits machine control signals to the valve 64 to effect movement of the valve to a more open disposition such that the supply of waste water from the waste water supply device 60 into the spray dryer reactor 40 is increased.

The dryer sub-process control device 52 formulates these machine control signals as a function of its evaluation of information that it receives from the sulfur oxide emissions level detector 54 concerning the detected level of sulfur oxides in the flue gas exiting the spray dryer reactor 40. Specifically, if the dryer sub-process control device 52 evaluates that the detected sulfur oxide emissions level is at an acceptable value, the dryer sub-process control device 52 controls the valve 64 to move from a more flow restricting disposition to a relatively less flow restricting disposition to effect the supply of waste water from the waste water supply device 60 into the spray dryer reactor 40. This movement of the valve 64 to a more open disposition results in an increased flow of waste water via the waste water supply device 60 into the spray dryer reactor 40 and consequentially influences the ratio of liquid to sulfur oxide absorbent in the spray dryer reactor—in particular, the increased flow of waste water, combined with the liquid otherwise comprised in the slurry fed into the spray dryer reactor 40 by the slurry feed assembly 48, results in an overall increase in the ratio or proportion of liquid to the sulfur oxide absorbent.

As noted, the flue gas entering the spray dryer reactor 40, although having just given up heat at the air preheater 14, still typically comprises sufficient heat content to both vaporize the liquid comprised in the slurry and the supplemental liquid introduced into the spray dryer reactor—namely, the waste water supplied via the waste water supply device 60. The method of the present invention provides an operational protocol which optimizes the vaporization of the supplementally introduced waste water while controlling the operation of the spray dryer reactor 40 to optimize the efficiency of sulfur oxide removal. In particular, this step of the method of the present invention includes controlling both the supply rate of supplemental liquid into the spray dryer reactor and the temperature of the flue gas entering the spray dryer reactor in dependence upon the temperature of the flue gas exiting the spray dryer reactor such that, in the event that the sensed temperature of the flue gas exiting the spray dryer reactor is below a minimum acceptable flue gas exit temperature, the supply rate of supplemental liquid is controlled according to the following operational protocol. The dryer sub-process control device 52 controls the waste water supply device 60 to decrease the supply rate of supplemental liquid into the spray dryer reactor by an initial decrease amount. Thereafter, the dryer sub-process control device 52 evaluates signal from the temperature sensor 58 indicating the temperature of the flue gas exiting the spray dryer reactor 40. If the sensed temperature of the flue gas exiting the spray dryer reactor is still below the minimum acceptable flue gas exit temperature, the dryer sub-process control device 52 controls at least one of the waste water supply device 60 or the drive motor 68 to, respectively, further decrease the initially decreased supply rate of supplemental waste water (supplied by the waste water supply device 60) and, either in addition to this decrease or instead of this decrease in the supply rate of supplemental waste water, to increase the temperature of the flue gas entering the spray dryer reactor until, via these actions, the temperature of the flue gas exiting the spray dryer reactor 40 increases to at least the minimum acceptable flue gas exit temperature, as indicated by the sensed temperature of the flue gas exiting the spray dryer reactor sensed by the temperature sensor 58.

If the dryer sub-process control device 52 commands, via appropriate machine control signals to the valve 64, the remedial action of decreasing the supply of waste water into the spray dryer reactor 40, the resultant change in the spray dryer reactor will be a relative decrease in the amount of liquid vaporized by the entering flue gas. Correspondingly, the decrease in the flue gas temperature in the spray dryer reactor will be of a relatively lesser magnitude as the overall heat given up by the flue gas in the vaporization of the liquid in the spray dryer reactor will be relatively less than if the supply of waste water were at its pre-decrease level.

On the other hand, the dryer sub-process control device 52 may be configured to command, in addition to, or in lieu of, the decrease in the supply of waste water, an increase in the temperature of the flue gas entering the spray dryer reactor 40. The dryer sub-process control device 52 commands this action via appropriate machine control signals to the drive motor 68, which decreases the rate of rotation of the rotary regenerative member 66 in response to the machine control signals. This rotation decrease results in less transfer of the heat content of the flue gas to the incoming air via the air preheater 14 and correspondingly relatively hotter flue gas entering the spray dryer reactor 40.

Thus, it can be seen that there has been provided a method which optimizes the conversion (via vaporization) of waste water accumulated from a fossil fuel-fired power generation system while controlling the operation of the spray dryer reactor to optimize the efficiency of sulfur oxide removal.

While one embodiment of the invention has been shown, it will be appreciated that modifications thereof, some of which have been alluded to hereinabove, may still be readily made thereto by those skilled in the art. It is, therefore, intended that the appended claims shall cover the modifications alluded to herein as well as all the other modifications which fall within the true spirit and scope of the present invention.

We claim:

1. A method for efficiently converting waste water to a gaseous state, the waste water being produced by a system having a combustion assembly, a regenerative air preheater, and a spray dryer reactor, the combustion assembly for burning combustible material in a process which produces flue gas having sulfur oxides therein and the flue gas passing successively through the regenerative air preheater for an exchange of heat from the flue gas to incoming air ultimately introduced into the burning process and thereafter through the spray dryer reactor for contacting the flue gas with a liquid slurry having sulfur oxide absorbent material so as to produce a dry particulate reaction product which can be disentrained from the flue gas after it has exited the spray dryer reactor, the method for efficiently converting waste water to a gaseous state comprising:

feeding the slurry to the spray dryer reactor, the slurry having a predetermined ratio of liquid to absorbent;

controlling the feed rate of the slurry into the spray dryer reactor as a function of a monitored sulfur oxide level such that the sulfur oxide level is maintained within an acceptable range;

sensing the temperature of the flue gas exiting the spray dryer reactor;

monitoring the sulfur oxide level of the flue gas downstream of the spray dryer reactor;

supplying supplemental liquid into the spray dryer reactor in a non-proportionate manner relative to the feed of absorbent into the spray dryer reactor such that the ratio of liquid to absorbent in the spray dryer reactor changes; and controlling both the supply rate of supplemental liquid into the spray dryer reactor and the temperature of the flue gas entering the spray dryer reactor in dependence upon the temperature of the flue gas exiting the spray dryer reactor such that, in the event that the sensed temperature of the flue gas exiting the spray dryer reactor is below a minimum acceptable flue gas exit temperature, the supply rate of supplemental liquid is controlled as follows:

(a) the supply rate of supplemental liquid into the spray dryer reactor is decreased by an initial decrease amount, (b) thereafter, the temperature of the flue gas exiting the spray dryer reactor is sensed, and (c) if the sensed temperature of the flue gas exiting the spray dryer reactor is still below the minimum acceptable flue gas exit temperature, implementing at least one of a further decrease in the initially decreased supply rate of supplemental liquid and a further increase in the temperature of the flue gas entering the spray dryer reactor until the sensed temperature of the flue gas exiting the spray dryer reactor is above the minimum acceptable flue gas exit temperature.

2. A method according to claim 1 wherein decreasing the temperature of the flue gas entering the spray dryer reactor includes controlling the regenerative air preheater in response to the sensed temperature of the flue gas exiting the spray dryer reactor to thereby reduce the temperature of the flue gas entering the spray dryer reactor.

3. A method according to claim 2 wherein the regenerative air preheater includes a rotatable heat exchange assembly having heat exchange elements sequentially rotatable into heat exchange contact with flue gas and controlling the regenerative air preheater in response to the sensed temperature of the flue gas exiting the spray dryer reactor includes reducing the rate of rotation of the regenerative air preheater to thereby reduce the temperature of the flue gas entering the spray dryer reactor.

4. A method according to claim 1 and further comprising sensing a characteristic of the spray dryer reactor operation and controlling the regenerative air preheater in response to the sensed characteristic of the spray dryer reactor operation to thereby vary the heat exchange from the flue gas to the incoming air such that the flue gas, after such heat exchange, enters the spray dryer reactor at a selected relatively hotter or colder temperature and thereby influences the temperature of the reacted flue gas exiting the spray dryer reactor to be correspondingly relatively hotter or colder, whereby a desired exit temperature of the reacted flue gas exiting the spray dryer reactor is achieved.

5. A method according to claim 4 wherein the step of sensing a characteristic of the spray dryer reactor operation includes sensing a characteristic of the flue gas at the spray dryer reactor.

6. A method according to claim 5 wherein sensing a characteristic of the flue gas at the spray dryer reactor includes sensing the temperature of the flue gas exiting the spray dryer reactor.

7. An assembly for efficiently converting waste water to a gaseous state, the waste water being produced a system having a combustion assembly, a regenerative air preheater, and a spray dryer reactor, the combustion assembly for burning combustible material in a process which produces flue gas having sulfur oxides therein and the flue gas passing successively through the regenerative air preheater for an exchange of heat from the flue gas to incoming air ultimately introduced into the burning process, the assembly for efficiently converting waste water to a gaseous state comprising:

a spray dryer reactor for contacting the flue gas with a liquid slurry having sulfur oxide absorbent material so as to produce a dry particulate reaction product which can be disentrained from the flue gas after it has exited the spray dryer reactor, the slurry having a predetermined ratio of liquid to absorbent;

means for controlling the feed rate of the slurry into the spray dryer reactor as a function of a monitored sulfur oxide level such that the sulfur oxide level is maintained within an acceptable range;

means for sensing the temperature of the flue gas exiting the spray dryer reactor;

means for monitoring the sulfur oxide level of the flue gas downstream of the spray dryer reactor;

means for supplying supplemental liquid into the spray dryer reactor in a non-proportionate manner relative to the feed of absorbent into the spray dryer reactor such that the ratio of liquid to absorbent in the spray dryer reactor changes; and means for controlling both the supply rate of supplemental liquid into the spray dryer reactor and the temperature of the flue gas entering the spray dryer reactor in dependence upon the temperature of the flue gas exiting the spray dryer reactor such that, in the event that the sensed temperature of the flue gas exiting the spray dryer reactor is below a minimum acceptable flue gas exit temperature, the supply rate of supplemental liquid is controlled as follows:

(a) the supply rate of supplemental liquid into the spray dryer reactor is decreased by an initial decrease amount, (b) thereafter, the temperature of the flue gas exiting the spray dryer reactor is sensed, and (c) if the sensed temperature of the flue gas exiting the spray dryer reactor is still below the minimum acceptable flue gas exit temperature, implementing at least one of a further decrease in the initially decreased supply rate of supplemental liquid and a further increase in the temperature of the flue gas entering the spray dryer reactor until the sensed temperature of the flue gas exiting the spray dryer reactor is above the minimum acceptable flue gas exit temperature.

* * * * *